(12) United States Patent
Unland et al.

(10) Patent No.: US 7,704,064 B2
(45) Date of Patent: Apr. 27, 2010

(54) EXTRUSION HEAD

(75) Inventors: Eckhard Unland, Pattensen (DE); Wieland Hoffmann, Hannover (DE)

(73) Assignee: Troester GmbH & Co. KG, Hannover (DE)

( * ) Notice: Subject to any disclaimer, the term of this patent is extended or adjusted under 35 U.S.C. 154(b) by 0 days.

(21) Appl. No.: 12/166,671

(22) Filed: Jul. 2, 2008

(65) Prior Publication Data
US 2009/0017148 A1 Jan. 15, 2009

(30) Foreign Application Priority Data
Jul. 2, 2007 (DE) .................. 10 2007 030 679

(51) Int. Cl.
*B29C 47/08* (2006.01)
(52) U.S. Cl. ............... 425/188; 425/192 R; 425/376.1; 425/461
(58) Field of Classification Search ................ 425/188, 425/192 R, 376.1, 461
See application file for complete search history.

(56) References Cited

U.S. PATENT DOCUMENTS

| | | | |
|---|---|---|---|
| 3,488,807 A | 1/1970 | Vossen | |
| 3,902,835 A | 9/1975 | Theysohn et al. | |
| 4,008,036 A | 2/1977 | Verlinden et al. | |
| 4,372,736 A * | 2/1983 | Gooch et al. | ............... 425/149 |
| 4,652,224 A | 3/1987 | Golisch et al. | |
| 5,061,166 A | 10/1991 | Gohlisch et al. | |
| 5,472,332 A * | 12/1995 | Gohlisch et al. | ............ 425/186 |
| 6,273,703 B1 * | 8/2001 | Hirschkorn | ................. 425/188 |

FOREIGN PATENT DOCUMENTS

| | | |
|---|---|---|
| DE | 2201631 | 8/1973 |
| DE | 2236363 | 2/1974 |
| DE | 2457532 | 6/1976 |
| DE | 3427022 | 1/1986 |
| DE | 3430062 | 2/1986 |
| DE | 3736231 | 7/1988 |
| DE | 3729447 | 3/1989 |
| DE | 3923290 | 12/1990 |
| DE | 4236120 | 10/1993 |
| DE | 19517247 | 11/1996 |
| GB | 1521756 | 8/1978 |

* cited by examiner

*Primary Examiner*—Robert B Davis
*Assistant Examiner*—Joseph Leyson
(74) *Attorney, Agent, or Firm*—Darby & Darby

(57) ABSTRACT

An extrusion head for at least one extruder including a first head part having a first joint and a second head having a second joint wherein the first head part and the second head part are pivotable with respect to each other using the respective first joint and second joint. When the extrusion head is in an operative position, the first head part rests against a first sealing face and the second head part rests against a second sealing face. A drive element is connected to the first head part and the second head part using a connecting element. The first head part and the second head part are movable using the drive element from a fixed operative position into an open rest position.

15 Claims, 2 Drawing Sheets

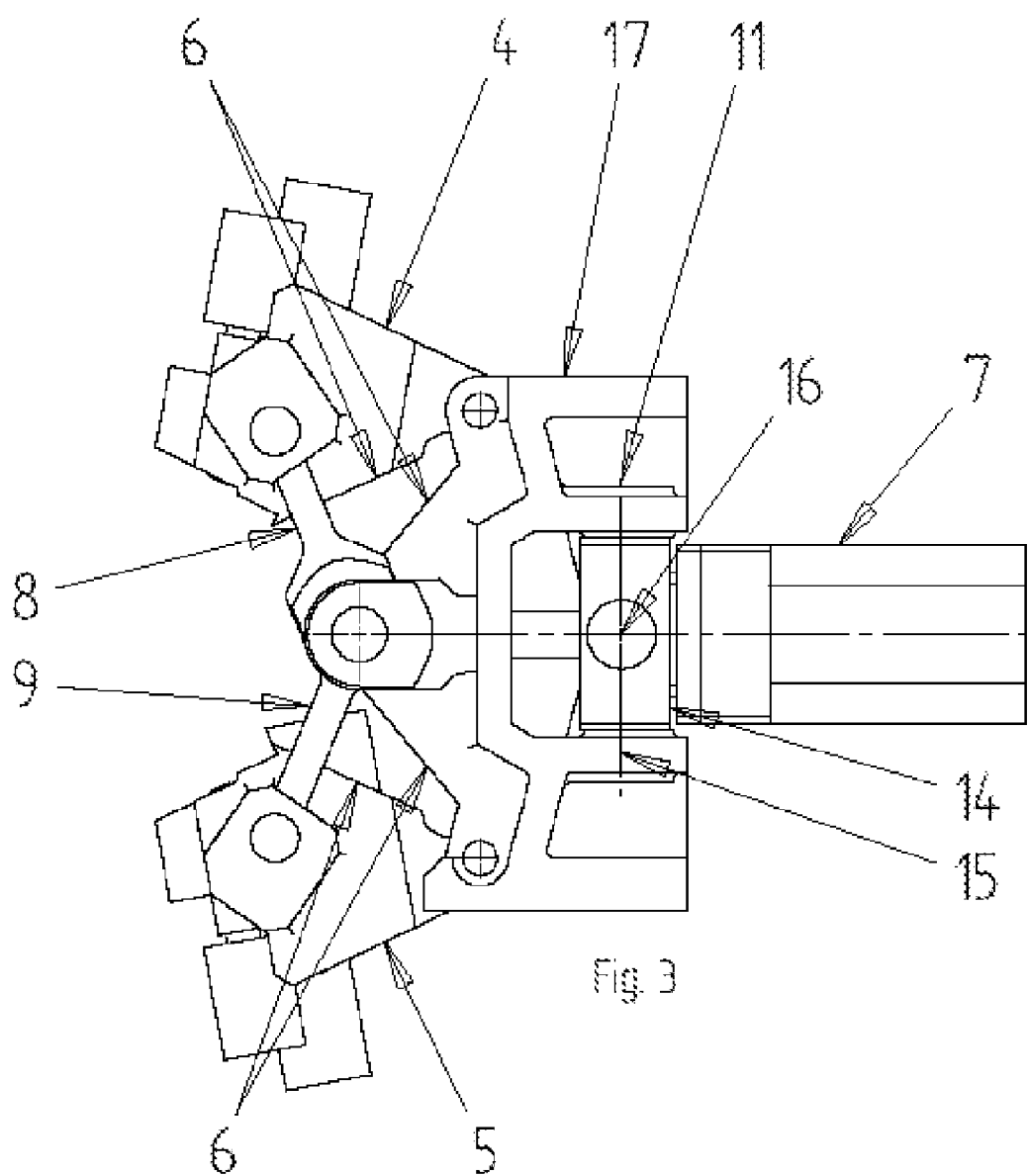

EXTRUSION HEAD

CROSS REFERENCE TO PRIOR APPLICATIONS

Priority is claimed to German Patent Application No. DE 10 2007 030 679.4, filed Jul. 2, 2007. The entire disclosure of this application is incorporated by reference herein.

The present invention relates to an extrusion head for one or more extruders, the extrusion head being intended in particular for one or more components and having two head parts which are pivotably movable relative to one another by means of a respective joint and, in an operative position, rest against a sealing face, the head parts being adapted to be biased by a drive means, in particular a hydraulic cylinder, and to be pivoted by the drive means into an opened rest position to allow free access.

BACKGROUND

In practice, extrusion heads of this type are already widely used in conjunction with one or more extruders. The head parts are adapted to be moved into a rest position for the purposes of cleaning or retrofitting.

Extrusion heads for the processing of rubber mixtures require, in addition to the closed operative position, also an opened rest position in which flow ducts of the extrusion head can be exchanged or cleaned. In the operative position, the head parts have to withstand the pressure of the rubber mixture. The driving power required for pivoting the head parts into the rest position, on the one hand, and for fixing them in the closed operative position, on the other hand, is applied in this case by a plurality of drive means, in particular hydraulic cylinders.

Extrusion heads known as clamp heads, in which two lateral clamps disposed opposite one another fix the two head parts in the operative position, respectively, are already known in practice. Clamps of this type are able to absorb much greater forces than the hydraulic piston/cylinder units used to move the clamps. For this purpose, the clamps have a respective contact face forming a clamping plane, so displacement toward the side of the extrusion head facing the extruders increases the clamping forces, as disclosed by DE 22 01 631 C3 and DE-OS 22 36 363, in which the holding-together forces are absorbed by clamps which are displaced by piston/cylinder units and secured in their closed position.

It is known from that DE-OS 22 36 363 to join together the movable part and the pivotable part of a wide extrusion head, using pivotable clamps which are pressed into their clamp seat by hydraulic piston/cylinder units.

It has been found to be a disadvantage in this regard that, in order to adjust the rest position, the clamp first has to be detached by the drive means and subsequently be pivoted out of the opening region of the head parts by a further drive means.

Also already known are extrusion heads known as hammer heads, in which each of the head parts has associated therewith two respective external, substantially parallel tension elements, of which a tension element head engages a corresponding recess in the respective head part in the operative position, thereby allowing the required pressure force to be applied by the tension elements.

DE 42 36 120 C1 has already described an extrusion head of this type for an extrusion system in the rubber or plastics processing industry, comprising a stationary head part which is to be flanged onto the extrusion system and at least one head part which rests against the extrusion strip, can be pivoted for cleaning purposes and is hingedly attached to the stationary head part by a joint. In the operative position, the head parts are for this purpose clamped to the stationary part by a pair of tie actuated by a respective piston/cylinder unit, and can be pivoted into the rest position by a further piston/cylinder unit.

DE 34 30 062 C2 and, in another embodiment, DE 37 36 231 A1 also disclose a respective extrusion head in which the movable parts of the extrusion head apply the high closing forces required, merely by means of piston/cylinder units. This necessitates the use of very powerful piston/cylinder units.

In the case of DE 34 30 062 C2, one end of the piston/cylinder unit is hingedly attached to the stationary part of the extrusion head in an outwardly pivotable manner. During the opening process, the piston/cylinder unit is pressed outward under the influence of this link, so the tie rods are pivoted out of the path of movement of the pivotable extrusion head parts to allow the opening thereof.

In addition, DE-OS 24 57 532 discloses a single extrusion head with two movable head halves, the common parting plane of which passes through the axis of the extruder, each two movable head halves forming a further parting plane or pair of pressure faces against the end face of the extruder. In this known extruder, a respective hydraulic cylinder is hingedly attached to the cylinder of the screw-type extruder centrally at the top and bottom, the piston rod of each hydraulic cylinder on a double lever having the function of releasing and fixing the cartridge and the profile strip and of opening, closing and fixing the head parts. Apart from the fact that this closing system is limited to an extrusion head with two movable head parts, clamps have to be pivoted to the side to open and close the head parts of this extrusion head also.

In any case, the tension frames have to be pivoted out to the side when the movable head parts are to be raised or lowered to open the feed ducts. However, the pivoting-out of the tension frames, which are already very wide, to the side, requires a large amount of space. In addition, the hydraulic cylinders, which are likewise pivotable for this purpose, have to be connected to a pressure source via flexible lines.

Also known is a construction in which the head parts are pivotably movable in the conventional manner about joints disposed on either side of a longitudinal axis, by means of a single drive means associated with the respective head part. The drive means, which are constructed as hydraulic cylinders, have the function in this case of transmitting the holding force and the sealing forces in the operative position and also of pivoting into the rest position and are for this purpose disposed substantially at right angles to the longitudinal axis. The resulting much greater dimensions have been found to be a disadvantage in this regard.

DE 39 23 290 C1 relates to an extruder head for producing profiles which are made of diverse mixtures of rubbers and/or plastics materials and are extruded from a plurality of extruders, with at least one movable head part. In this case a drive means has the function of generating the closing force for pressing the main parts together and also acts as a wedge-shaped locking device having clamps.

SUMMARY OF THE INVENTION

An aspect of the present invention is to provide an extrusion head including head parts that can be fixed in the operative position in a simple manner and using few components and can be pivoted into the rest position. In addition, the extrusion head may have a compact construction.

The present invention provides an extrusion head which is intended for one or more components, in particular rubber components, and in which the drive means is connected to the two head parts by a connecting element, the drive means allowing the head parts to be fixed in the operative position and also to be pivoted into the rest position. In this case, the drive means transmits the closing or holding force required for the seal in the operative position simultaneously to the two head parts, which can be moved toward one another, so the extrusion head constructed in this way can be produced with fewer drive means than in the prior art or even with a single drive means. As a result, the production costs and control complexity may be reduced and the overall space required may decrease significantly. In addition, the drive means has the function of maintaining the operative position and also of allowing the head parts to pivot into the rest position, thereby potentially obviating the need for an additional drive means. At the same time, the connecting element compensates for the holding force which can be transmitted to the head parts, in the operative position, thereby potentially producing a uniform and thus reliable seal by substantially concurrent closing forces.

In a particularly convenient embodiment of the invention, at least two drive means acting on a respective connecting element are disposed on either side of the extrusion head. This allows that the extrusion head can be accessed, in particular in the rest position. At the same time, the desired compact construction may be achieved and uniform introduction of forces is allowed by the drive means which are disposed symmetrically about the central axis, in particular in a common plane.

The connecting element could be connected to the drive means by a pivoted lever in order to divert the direction of action of the driving power. On the other hand, it is simple if the drive means are co-planar with a central longitudinal axis of the extrusion head in order to further reduce the overall size and, in so doing, also prevent an undesirable introduction of differing forces.

The connecting element could be constructed as a shaped part or be equipped with a slideway to allow the simultaneous transmission of force to the two head parts. Particularly advantageous, on the other hand, is an embodiment in which each connecting element has two tie rods which are movable relative to one another and enclose therebetween an angle determined by the respective position. The two head parts are thus connected to the tie rods in a comparatively straightforward manner, the tie rods also being able to transmit pressure forces for adjusting the rest position. In addition, the tie rods allow individual length adaptation for tolerance compensation.

The tie rods are hingedly attached to the respective head part, preferably at a maximum distance from the joint that allows the head part to pivot. In addition, it is particularly beneficial if the points where the tie rods are hingedly attached to the respective head part are determined in such a way that the lines of action of the holding force transmittable by the tie rods in the operative position are substantially parallel to the melt pressure forces occurring during operation. As a result, the direction of action of the holding force transmittable by the tie rods is substantially opposed to the direction of action of the melt pressure forces, thereby producing an improved seal without increasing the driving power. In this case the points where the tie rods are hingedly attached to the respective head part are disposed, in particular, on a side, turned away from the drive means, of the plane determined by the joints of the head parts.

In particular, this optimum introduction of forces is allowed by the fact that the points where the tie rods are hingedly attached to the respective head part are determined in such a way that the respective orientation of the tie rods in the operative position is perpendicular to a sealing face associated with the respective head part. As used herein, the term "perpendicular" shall be understood to at mean at least substantially perpendicular.

In addition, it has beneficial if the tie rods associated with a common drive means enclose an angle of less than 90°, in particular an angle of between 40° and 80° in the operative position. This allows optimum transmission of the tensile force that can be introduced by the drive means, thereby preventing the tie rods associated with each of the two head parts, in particular, from influencing one another in an undesirable manner.

In a further particularly advantageous embodiment of the present invention, the tie rods associated with a common drive means are each connected to the drive means by a bearing constructed as a radial bearing and the two bearings are disposed coaxially. For this purpose, for example, the piston rod of the hydraulic cylinder forming the drive means is connected to a transverse shaft forming a respective bearing for two tie rods. In addition, the coaxial mount, which can easily be produced in this way, allows simple introduction of forces into the respective tie rod, the magnitudes of the forces corresponding at least approximately to one another.

In addition, it is particularly convenient if the bearings connecting the tie rods to the drive means and the joints of the two head parts are disposed in a common plane in order to optimize the introduction of forces, and thus the holding forces, in the closed operative position of the head parts.

Another, likewise particularly beneficial embodiment of the present invention is achieved if the drive means is disposed so as to be movable to a limited extent in the operative position, to compensate for positional tolerances. As a result, tolerances which are unavoidable in practice may be compensated and an uneven introduction of forces is avoided owing to the compensatory movability transverse to the movement of the drive means. For example, a hydraulic cylinder forming the drive means can for this purpose be constructed so as to be movable transverse to the cylinder axis in a sliding guide in the direction at least one spatial axis.

Another, likewise particularly beneficial development of the present invention is achieved if the drive means is pivotably movable to a limited extent about two spatial axes by means of a mount, in particular a gimbal mount, so the drive means is disposed so as to be pivotably movable about two axes set slightly apart from the radial bearings associated with the tie rods.

Similarly, the desired compensation is also allowed by another modification of the present invention, in which the drive means is supported against an abutment, at least some portions of which are spherical, to compensate for positional tolerances, the hydraulic cylinder having on its end face turned toward the head parts a convex formation which rests against the concave spherical abutment and accordingly has limited movability in the manner of a ball head.

BRIEF DESCRIPTION OF THE DRAWINGS

The present invention permits various embodiments. In order to further illustrate the basic principle of the present invention, one of these embodiments is shown in the drawings and will be described below. In the drawings.

FIG. 3 is a side view of the extrusion head shown in FIG. 1 in a rest position.

DETAILED DESCRIPTION

Figure 1:
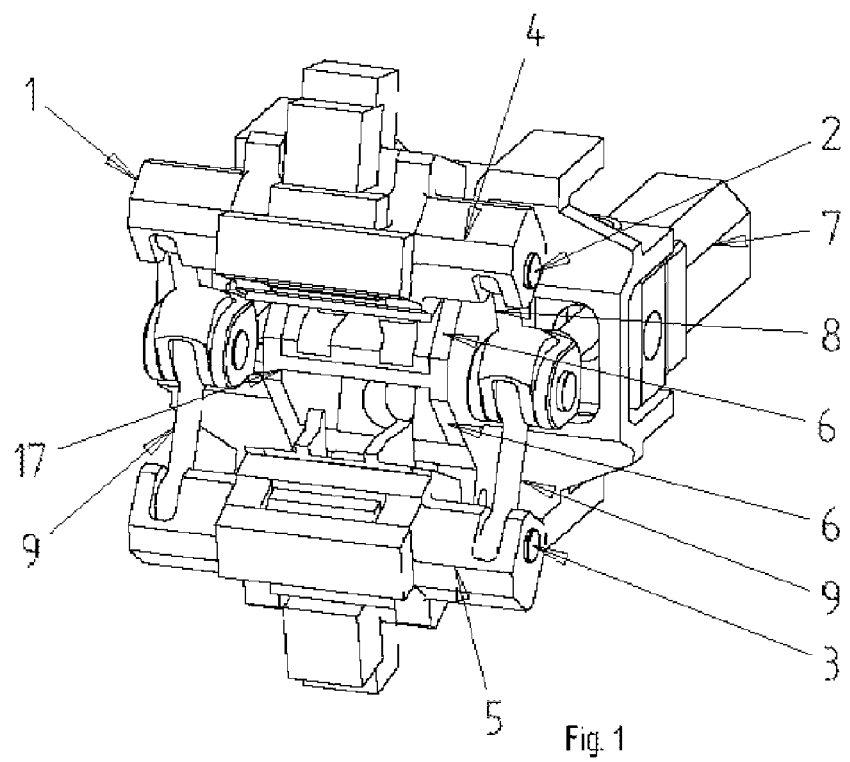
FIG. 1 is a perspective view of an extrusion head according to the present invention.

FIG. 1 is a perspective view of an extrusion head 1 according to the invention for rubber mixtures, in an opened rest position. The extrusion head 1 has two head parts 4, 5 which are pivotably movable relative to one another about a respective joint 2, 3 and, in an operative position, rest against a central part 17 along a sealing face 6. The head parts 4, 5 are disposed in such a way that they can be pivoted by two drive means 7 into the illustrated rest position to allow free access. The two drive means 7 are disposed on either side of the head parts 4, 5 and each connected via two tie rods 8, 9 to the head part 4, which is constructed as the upper head part, and also to the head part 5, which is constructed as the lower head part.

Figure 2:
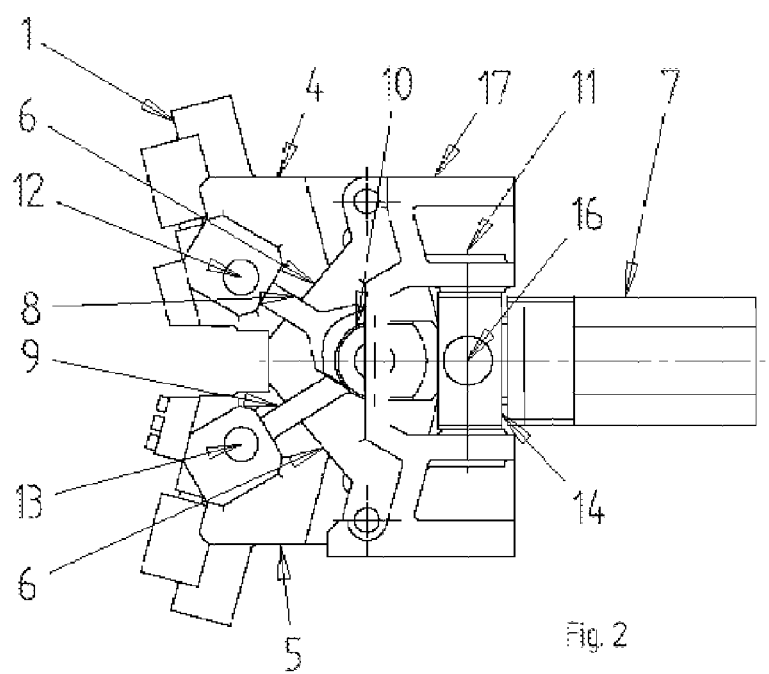
FIG. 2 is a side view of the extrusion head shown in FIG. 1 in an operative position.

The transmission of driving power to the head parts 4, 5 is illustrated in greater detail in the side views of FIGS. 2 and 3 which show the extrusion head 1 illustrated in FIG. 1 in an operative position, on the one hand, and in a rest position, on the other hand. As can be seen, the drive means 7 is connected to the two head parts 4, 5 by a connecting element 10 formed by the two tie rods 8, 9, which are movable relative to one another, so the drive means 7 allows the head parts 4, 5 to be fixed in the operative position and also to be pivoted into the rest position. For this purpose, the tie rods 8, 9 are each connected to the drive means 7 by a bearing 11 constructed as a radial bearing, the two bearings 11 being disposed coaxially. The points 12, 13 where the tie rods 8, 9 are hingedly attached to the respective head part 4, 5 are in this case determined in such a way that the respective orientation of the tie rods 8, 9 in the operative position is substantially perpendicular to the sealing face 6, associated with the respective head part, on the central part 17. To compensate for positional tolerances, the drive means 7 is disposed so as to be pivotably movable to a limited extent about two spatial axes 15, 16 by means of a gimbal mount 14, thereby compensating for tolerances and preventing an uneven introduction of forces into the tie rods 8, 9.

The invention claimed is:

1. An extrusion head for an extruder comprising:
   a first head part having a first joint;
   a second head part having a second joint, wherein the first head part and the second head part are pivotable relative to each other using the respective first joint and second joint;
   a first sealing face;
   a second sealing face, wherein, when the extrusion head is in an operative position, the first head part rests against the first sealing face and the second head part rests against the second sealing face,
   a connecting element; and
   a drive element connected to the first head part and the second head part using the connecting element, wherein the first head part and the second head part are movable using the drive element from a fixed operative position into an open rest position, and wherein the connecting element includes a first tie rod and a second tie rod pivotably movable relative to each other about a common pivot point.

2. The extrusion head as recited in claim 1, wherein the drive element is a hydraulic cylinder.

3. The extrusion head as recited in claim 1, further comprising at least one additional drive element and at least one corresponding connecting element.

4. The extrusion head as recited in claim 3, wherein the drive element and the at least one additional drive element are disposed along a central longitudinal axis of the extrusion head.

5. The extrusion head as recited in claim 1, wherein the first head part and the second head part each includes a respective hinge attachment point configured to receive one of the first and the second tie rods and wherein each tie rod transmits a holding force parallel to a melt pressure force when the extrusion head is in the operative position.

6. The extrusion head as recited in claim 1, wherein the first tie rod is disposed perpendicular to the first sealing face and the second tie rod is disposed perpendicular to the second sealing face when the extrusion head is in the operative position.

7. The extrusion head as recited in claim 1, wherein the first tie rod and the second tie rod are disposed at an angle of less than 90° relative to each other when the extrusion head is in the operative position.

8. The extrusion head as recited in claim 7, wherein the first tie rod and the second tie rod are disposed at an angle greater than 40° and less than 80° relative to each other when the extrusion head is in the operative position.

9. The extrusion head as recited in claim 1, further comprising two radial bearings disposed coaxially and each connecting one of the first tie rod and the second tie rod to the drive element.

10. The extrusion head as recited in claim 9, wherein the bearings and the first joint and the second joint are disposed in a common plane.

11. The extrusion head as recited in claim 1, wherein the drive element is movable.

12. The extrusion head as recited in claim 11, wherein the drive element is pivotably movable about a first spatial axis and a second spatial axis using a mount.

13. The extrusion head as recited in claim 12, wherein the mount is a gimbal mount.

14. The extrusion head as recited in claim 1, wherein the drive element is supported using an abutment.

15. The extrusion head as recited in claim 14, wherein the abutment is at least partially spherical.

\* \* \* \* \*